US011953146B1

(12) United States Patent
Cifers, III et al.

(10) Patent No.: US 11,953,146 B1
(45) Date of Patent: *Apr. 9, 2024

(54) ACCESSORY MOUNT EXTENSION ARM

(71) Applicant: YakAttack LLC, Farmville, VA (US)

(72) Inventors: Luther Cifers, III, Farmville, VA (US); Daniel Anderson Newman, Salem, VA (US); Joey Martin Pruitt, Appomattox, VA (US); John Aubrey Hipsher, Farmville, VA (US)

(73) Assignee: YakAttack LLC, Farmville, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/677,549

(22) Filed: Feb. 22, 2022

Related U.S. Application Data (63) Continuation-in-part of application No. 17/511,892, filed on Oct. 27, 2021, which is a continuation-in-part
(Continued)

(51) Int. Cl.
*F16M 13/02* (2006.01)
*F16B 7/04* (2006.01)
(Continued)

(52) U.S. Cl.
CPC ............ *F16M 13/02* (2013.01); *F16B 7/04* (2013.01); *F16B 35/06* (2013.01); *F16M 11/14* (2013.01);
(Continued)

(58) Field of Classification Search
CPC .... F16M 13/02; F16M 11/14; F16M 11/2085; F16B 7/04; F16B 35/06; F16B 2200/30
(Continued)

(56) References Cited

U.S. PATENT DOCUMENTS

| | | |
|---|---|---|
| 585,475 A | 6/1897 | Huber |
| 1,705,086 A | 3/1929 | Ferguson |

(Continued)

FOREIGN PATENT DOCUMENTS

| | | |
|---|---|---|
| FR | 2604842 A1 | 5/1988 |
| JP | H1060755 A | 3/1998 |
| JP | 2002180412 A | 6/2002 |

OTHER PUBLICATIONS

USPTO, Office Action dated Dec. 8, 2015 in related U.S. Appl. No. 13/954,253, filed Jul. 30, 2013.
(Continued)

*Primary Examiner* — Kimberly T Wood
(74) *Attorney, Agent, or Firm* — Thedford I. Hitaffer; Hitaffer & Hitaffer, PLLC (57) ABSTRACT

A mounting structure has characteristics, properties, or features that provide stability for the accessories mounted or supported in relation thereto. The mounting structure may be in the form of a rigid or a semi-rigid composition, which may be formed at least in part by, or sufficiently covered or coated with, a material having a damping capacity, or an ability to isolate an accessory for a vessel, a slotted track supported in relation to the vessel, or a mounting arrangement supported in relation to the vessel or the slotted track. The mounting structure may be in the form of an extension arm for offsetting the accessory laterally, crosswise or transversely in relation to the vessel, slotted track, or mounting arrangement. The extension arm may include, or carry, a surface, that is configured to interlock with a surface of a mating structure, namely, a mounting arrangement and/or an accessory or accessory mount. The surface may be in the form of a ratcheting surface comprising radially extending protrusions or recesses that cooperate with mating radially extending recesses or protrusions supported by the surface of the mating structure. The mating surfaces interlock to (Continued)

prohibit movement of one surface in relation to another, for example, to hold the mounting structure in fixed relation to the mounting arrangement and/or the accessory, or the accessory mount.

22 Claims, 8 Drawing Sheets

Related U.S. Application Data of application No. 15/831,400, filed on Dec. 5, 2017, now abandoned, which is a continuation of application No. 13/960,772, filed on Aug. 6, 2013, now Pat. No. 9,863,576, which is a continuation-in-part of application No. 13/954,253, filed on Jul. 30, 2013, now Pat. No. 9,671,060.

(60) Provisional application No. 61/680,254, filed on Aug. 6, 2012, provisional application No. 61/677,455, filed on Jul. 30, 2012.

(51) Int. Cl.
  *F16B 35/06* (2006.01)
  *F16M 11/14* (2006.01)
  *F16M 11/20* (2006.01)

(52) U.S. Cl.
  CPC ...... *F16M 11/2085* (2013.01); *F16B 2200/30* (2018.08)

(58) Field of Classification Search
  USPC ............ 248/220.22, 222.13, 223.41, 224.51, 248/222.14, 224.8, 220.21, 224.61, 248/225.11
  See application file for complete search history.

(56) References Cited

U.S. PATENT DOCUMENTS

| | | | |
|---|---|---|---|
| 1,809,758 A | | 6/1931 | Heyman |
| 2,076,160 A | | 4/1937 | Robinson |
| 2,157,309 A | | 5/1939 | Swedman et al. |
| 2,176,644 A | | 10/1939 | Sladek |
| 2,269,847 A | | 1/1942 | Feinson |
| 2,859,710 A | | 11/1958 | Elsner |
| 2,928,512 A | | 3/1960 | Slater et al. |
| 3,129,751 A | | 4/1964 | Alexander |
| 3,208,560 A | | 9/1965 | Cote |
| 3,291,088 A | | 12/1966 | Klose |
| 3,331,348 A | | 7/1967 | Dyer |
| 3,381,925 A | | 5/1968 | Higuchi |
| 3,612,454 A | * | 10/1971 | Linn ...................... A01K 97/10 248/314 |
| 4,084,289 A | | 4/1978 | Naimo |
| 4,126,228 A | | 11/1978 | Bala et al. |
| 4,183,387 A | | 1/1980 | Lenz |
| 4,226,394 A | | 10/1980 | Einhorn |
| 4,244,501 A | | 1/1981 | Ingram |
| 4,273,487 A | | 6/1981 | Mclennan |
| 4,315,393 A | | 2/1982 | Schack et al. |
| 4,616,771 A | | 10/1986 | Heideman |
| 4,699,484 A | | 10/1987 | Howell et al. |
| 4,835,852 A | | 6/1989 | Asplund et al. |
| 4,969,784 A | | 11/1990 | Yanke |
| 5,026,013 A | | 6/1991 | Robbins |
| 5,142,809 A | * | 9/1992 | O'Brien ................ A01K 97/10 248/514 |
| 5,222,851 A | | 6/1993 | Dickerson |
| 5,244,186 A | | 9/1993 | Chandler |
| 5,305,700 A | | 4/1994 | Strong et al. |
| 5,421,036 A | | 6/1995 | Stevens et al. |
| 5,487,518 A | | 1/1996 | Mccraney et al. |
| 5,598,959 A | | 2/1997 | Lorensen et al. |
| 5,676,088 A | | 10/1997 | Blaisdell et al. |
| 5,864,997 A | | 2/1999 | Kelly |
| 6,019,543 A | | 2/2000 | Junker |
| 6,021,984 A | | 2/2000 | Mills |
| 6,086,300 A | | 7/2000 | Froehlich |
| 6,238,153 B1 | * | 5/2001 | Karrer ................... B60P 7/0815 410/104 |
| 6,290,426 B1 | | 9/2001 | Gijsel et al. |
| 6,398,149 B1 | | 6/2002 | Hines et al. |
| 6,460,743 B2 | | 10/2002 | Edgerly et al. |
| 6,585,465 B1 | | 7/2003 | Hammond et al. |
| 6,644,901 B2 | | 11/2003 | Breckel |
| 6,736,300 B2 | | 5/2004 | Deakin |
| 6,938,782 B2 | | 9/2005 | Dean et al. |
| 7,044,701 B2 | | 5/2006 | Herb |
| 7,070,374 B2 | | 7/2006 | Womack et al. |
| 7,401,995 B2 | | 7/2008 | Senakiewich, II et al. |
| 7,497,651 B2 | | 3/2009 | Harberts et al. |
| 7,621,487 B2 | | 11/2009 | Brown et al. |
| 7,757,914 B2 | | 7/2010 | Book et al. |
| D622,208 S | | 8/2010 | Sautter et al. |
| D635,086 S | | 3/2011 | Shen |
| 8,100,600 B2 | | 1/2012 | Blum |
| 8,196,789 B2 | | 6/2012 | Kraeuter et al. |
| 8,647,009 B2 | | 2/2014 | Kobayashi |
| D703,605 S | | 4/2014 | Sautter et al. |
| 8,763,978 B2 | | 7/2014 | Newman et al. |
| 8,974,160 B2 | | 3/2015 | Bender |
| D731,400 S | | 6/2015 | Condon et al. |
| 9,187,047 B2 | | 11/2015 | Sautter et al. |
| 9,365,150 B2 | | 6/2016 | Baldsiefen et al. |
| 9,671,060 B1 | | 6/2017 | Cifers |
| 9,828,073 B1 | | 11/2017 | Cifers |
| 9,863,576 B1 | * | 1/2018 | Cifers ................ F16M 11/2085 |
| 9,879,819 B1 | | 1/2018 | Cifers |
| D814,388 S | | 4/2018 | Salsi et al. |
| 10,155,306 B1 | | 12/2018 | Carnevali |
| 10,429,002 B2 | | 10/2019 | Carnevali |
| 10,473,150 B2 | | 11/2019 | Carnevali et al. |
| 10,563,813 B1 | | 2/2020 | Cifers |
| 2001/0008600 A1 | | 7/2001 | Fraleigh |
| 2003/0053882 A1 | | 3/2003 | Reuter |
| 2003/0156919 A1 | | 8/2003 | Schwarz et al. |
| 2004/0131440 A1 | | 7/2004 | Womack et al. |
| 2004/0165947 A1 | | 8/2004 | Herb |
| 2005/0092876 A1 | | 5/2005 | Carnevali |
| 2005/0269465 A1 | | 12/2005 | Carnevali |
| 2006/0175595 A1 | | 8/2006 | Carnevali |
| 2007/0119887 A1 | | 5/2007 | Foley |
| 2007/0194191 A1 | | 8/2007 | Persson et al. |
| 2009/0224119 A1 | | 9/2009 | Heffernan |
| 2009/0279944 A1 | | 11/2009 | Schmitz et al. |
| 2010/0078454 A1 | | 4/2010 | Sautter et al. |
| 2010/0150484 A1 | | 6/2010 | Watson |
| 2010/0192505 A1 | | 8/2010 | Schaefer et al. |
| 2011/0031370 A1 | | 2/2011 | Carnevali |
| 2011/0139841 A1 | | 6/2011 | Sautter et al. |
| 2011/0248131 A1 | * | 10/2011 | Genschorek ............. B30B 3/04 248/220.22 |
| 2012/0043448 A1 | * | 2/2012 | Liao ................... F16M 11/2014 248/534 |
| 2012/0045276 A1 | | 2/2012 | Carnevali |
| 2014/0003878 A1 | | 1/2014 | Knox et al. |
| 2015/0030386 A1 | | 1/2015 | Carnevali |
| 2016/0186925 A1 | | 6/2016 | Bettin |
| 2017/0089058 A1 | | 3/2017 | Roth |

OTHER PUBLICATIONS

USPTO, Final Office Action dated Jun. 10, 2016 in related U.S. Appl. No. 13/954,253, filed Jul. 30, 2013.
USPTO, Supplemental Final Office Action dated Jul. 7, 2016 in related U.S. Appl. No. 13/954,253, filed Jul. 30, 2013.
USPTO, Advisory Action dated Dec. 12, 2016 in related U.S. Appl. No. 13/954,253, filed Jul. 30, 2013.
USPTO, Office Action dated Jan. 14, 2016 in related U.S. Appl. No. 13/960,772, filed Aug. 6, 2013.

(56) References Cited

OTHER PUBLICATIONS

USPTO, Final Office Action dated Jul. 12, 2016 in related U.S. Appl. No. 13/960,772, filed Aug. 6, 2013.
USPTO, Office Action dated Sep. 14, 2016 in related U.S. Appl. No. 13/960,772, filed Aug. 6, 2013.
USPTO, Final Office Action dated May 17, 2017 in related U.S. Appl. No. 13/960,772, filed Aug. 6, 2013.
USPTO, Advisory Action dated Jul. 5, 2017 in related U.S. Appl. No. 13/960,772, filed Aug. 6, 2013.
YouTube video titled "Harmony Slide Trax Mounting Plate", www.youtube.com/watch?v=rYhB72SLnXo (Published on Mar. 30, 2011).

* cited by examiner

ACCESSORY MOUNT EXTENSION ARM

CROSS-REFERENCE TO RELATED APPLICATIONS

This application is a continuation-in-part of U.S. patent application Ser. No. 17/511,892, filed Oct. 27, 2021, which is a continuation-in-part of U.S. patent application Ser. No. 15/831,400, filed Dec. 5, 2017, which is a continuation of U.S. patent application Ser. No. 13/960,772, filed Aug. 6, 2013, issued as U.S. Pat. No. 9,863,576, on Jan. 9, 2018, which is a continuation-in-part of U.S. patent application Ser. No. 13/954,253, filed Jul. 30, 2013, issued as U.S. Pat. No. 9,671,060, on Jun. 6, 2017, which claims the benefit of U.S. Provisional Application No. 61/680,254, filed Aug. 6, 2012, and claims the benefit of U.S. Provisional Application No. 61/677,455, filed Jul. 30, 2012, the disclosures of which are incorporated herein by reference.

BACKGROUND OF THE INVENTION

This invention relates in general to supports for positioning apparatus or articles, or means for steadying apparatus or articles, and more particularly, for supporting or attaching apparatus or articles on or in relation to an object, and most particularly, for supporting or attaching recreational fishing accessories to maritime vessels, such as kayaks and the like.

Mounting arrangements for mounting accessories, such as, cameras, rod holders, fish finders, to vessels, such as kayaks and the like, are well-known.

A mounting arrangement may be directly mounted to a vessel, or indirectly mounted, such as, via a slotted track, which may be mounted to the vessel, and to which accessories may be, in turn, mounted. Mounting accessories to a slotted track may provide for, or result in, a more versatile mounting arrangement by virtue that the accessories may be adjustable, for example, linearly, along the slotted track.

Accessories may be mounted in spaced relation to the vessel or slotted track by a mounting arrangement, which may include some vertical support to vertically offset the accessory from the vessel or slotted track, an articulating member, such as a hinge joint, which permits movement of the accessory with one degree of freedom, or a ball joint, which permits movement of the accessory with three degrees of freedom, and/or an extension arm to offset the accessory laterally, crosswise or transversely in relation to the vessel or slotted track.

The more complex or convoluted the mounting arrangements, the more removed or spaced apart the accessory may be in relation to the vessel or slotted track, and more prone the accessory may be subject to vibration, particularly, in the case when rigid components support the accessory, for example, in a cantilevered fashion.

What is needed is a mounting arrangement for mounting accessories that provides stability for the accessories.

SUMMARY OF THE INVENTION

This invention relates to a mounting structure, which has characteristics, properties, or features that provide stability for the accessories mounted or supported in relation thereto.

The mounting structure may be in the form of a rigid or a semi-rigid composition, which may be formed at least in part by, or sufficiently covered or coated with, a material having a damping capacity, or an ability to isolate an accessory for a vessel, a slotted track supported in relation to the vessel, or a mounting arrangement supported in relation to the vessel or the slotted track.

The mounting structure may be in the form of an extension arm for offsetting the accessory laterally, crosswise or transversely in relation to a vessel, or a slotted track, in turn, mounted in relation to the vessel, or a mounting arrangement supported in relation to the vessel or the slotted track.

The extension arm may include, or carry, a surface that is configured to interlock with the surface of a mating structure, namely, a mounting arrangement and/or an accessory, or accessory mount. The surface, namely, the interlocking surface, may be in the form of a ratcheting surface, such as, a surface comprising radially extending protrusions or recesses that cooperate with mating radially extending recesses or protrusions, respectively, supported by the surface of the mating structure. The mating surfaces interlock to prohibit movement of one surface in relation to another surface, for example, to hold the mounting structure in fixed relation to the mounting arrangement and/or the accessory, or the accessory mount.

The extension arm may be comprised of a mounting surface that may be provided with a slot and an interlocking feature alongside the slot that may mate with an interlock on an accessory so that the accessory can be mounted in a first position in a lengthwise direction of the extension arm or perpendicularly or transverse to the extension arm.

Various advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
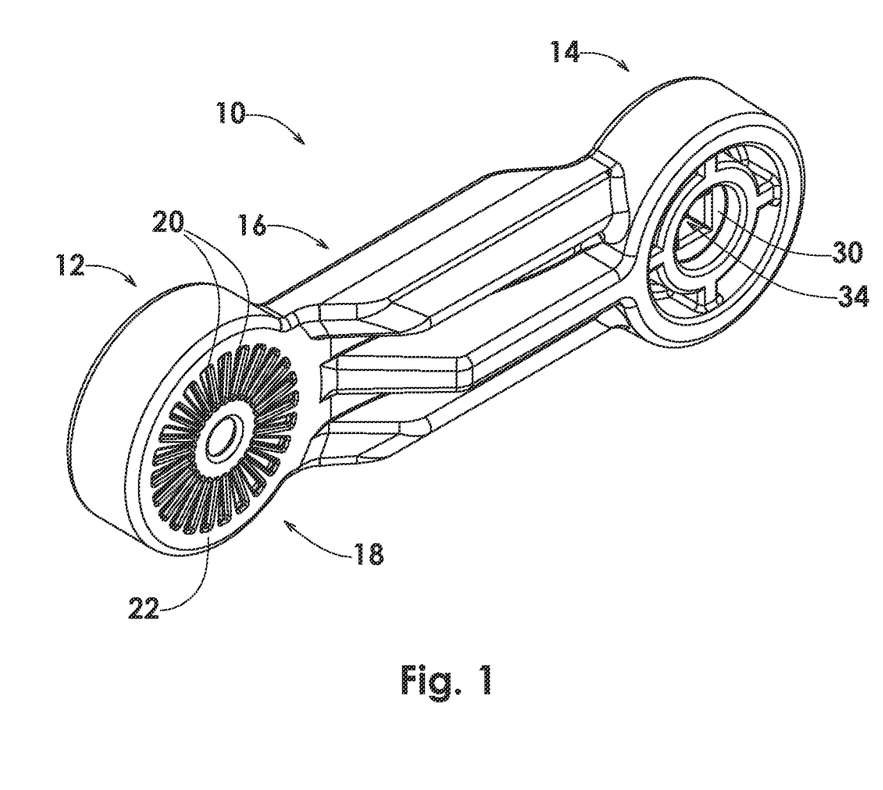
FIG. 1 is a perspective view of an extension arm for mounting an accessory to a supporting surface according to an exemplary embodiment of the invention.
Figure 2:
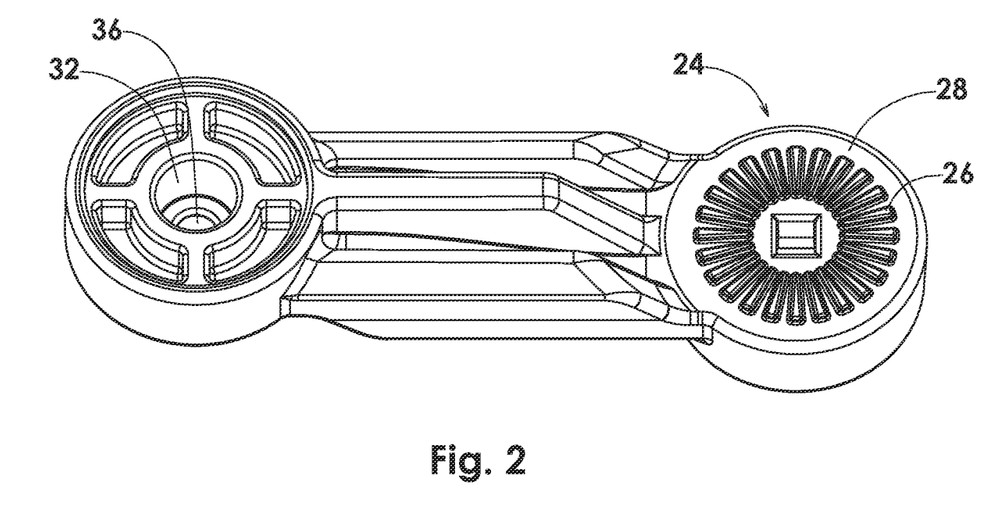
FIG. 2 is a perspective view of the extension arm shown in FIG. 1 as viewed from an opposing side.

Referring now to the drawings, there is illustrated in FIGS. 1 and 2 an extension arm 10 comprised of a first end 12 and a second end 14 with a connecting member 16 therebetween connecting the first end 12 in relation to the second end 14, for example, in spaced relation to one another.

The first end 12 may be comprised of a first mating structure (generally indicated at 18 when viewing FIG. 1), which may be configured to be matingly engageable with a second mating structure, which together may form a connection, which may be in the form of an articulating connection, such as a pivot joint. The second mating structure may be supported in relation to a vessel, such as a kayak, or a slotted track, which, in turn, may be supported in relation to the vessel, or a part of a mounting arrangement, which may be supported in relation to the vessel or the slotted track. The first mating structure may include a first interlocking structure, which, for example, may be comprised of radially extending recesses 20 supported in relation to a planar or generally planar surface 22. The recesses 20 may be engageable with radially extending protrusions, which may be supported in relation to a planar or generally planar surface of the second mating structure. It should be appreciated that the first mating structure may comprise radially extending protrusions that may be engageable with radially extending recesses, which may be supported in relation to the planar or generally planar surface of the second mating structure.

The second end 14 similarly may be comprised of a first mating structure (generally indicated at 24 when viewing FIG. 2), which may be configured to be matingly engageable with a second mating structure, which together may form a connection, which may be in the form of an articulating connection, such as a pivot joint. The second mating structure may be a component or feature of an accessory, such as a camera, rod holder, fish finder, or an accessory mount, which, in turn, may be configured to support an accessory. The first mating structure may include a first interlocking structure, which, for example, may comprise radially extending protrusions 26 supported in relation to a planar or generally planar surface 28. The protrusions 26 may be engageable with radially extending recesses, which may be supported in relation to a planar or generally planar surface of the second mating structure. It should be appreciated that the first mating structure may comprise radially extending recesses that may be engageable with radially extending protrusions, which may be supported in relation to the planar or generally planar surface of the second mating structure.

It should be noted that the planar or generally planar surface 22 of the first end 12 may lie in the same or substantially same plane as the planar or generally planar surface 28 of the second end 14 but face in an opposing direction, so that when mated with a mating surface (e.g., a vessel, a slotted track or a mounting arrangement, or an accessory or an accessory mount), the planar or generally planar surfaces 22, 28 lie in the same plane or substantially the same plane as similar planar surfaces of the mating surfaces (e.g., a vessel, a slotted track or a mounting arrangement, or an accessory or an accessory mount). In this way, a cascading arrangement of connections may lie in the same plane or substantially the same plane.

The ends 12, 14 may be substantially cylindrical in shape, or any other suitable shape, and may comprise a counterbore 30, 32, which may be centrally located in relation to the ends 12, 14, and holes or passages 34, 36, which may extend laterally, crosswise or transversely therethrough. Either or both of the holes or passages 34, 36 may be configured to permit rotation of a fastener in relation thereto, or keyed to mate with a fastener, or a portion thereof, to prevent rotation of the fastener in relation thereto. For example, keyed holes or passages 34, 36 may have a square shape that mates with a square shaped shank of a fastener or a portion of the fastener. It should be appreciated that other shapes may be provided in which the holes or passages 34, 36 may mate with the fastener. It should be understood that the fasteners may be provided for adjoining the ends 12, 14 to similar ends of a mating structure (e.g., a vessel, a slotted track or a mounting arrangement, or an accessory or an accessory mount).

The ends 12, 14 may include cylindrical walls and/or ribs supported, for example, in relationship with the planar or generally planar surfaces 22, 28. The cylindrical walls may be concentrically arranged cylindrical walls, including an inner cylindrical wall and an outer cylindrical wall. The inner cylindrical wall may define the counterbores 30, 32, which may be bounded by the inner cylindrical wall, with the holes or passages 34, 36 therein passing through the planar or generally planar wall. The outer cylindrical wall may be arranged about the inner cylindrical wall. Ribs and/or gussets may be connected between the inner and outer cylindrical walls and connected to the planar or generally planar surfaces 22, 28 to form a substantially rigid structure.

Although the illustrated ends 12, 14 are cylindrical in shape, it should be appreciated that the ends may be of any other shape or configuration suitable for forming a connection between mating structures. For example, the ends may be in the form of portions of a ball and socket configuration, or some other suitable configuration, or a combination of configurations, that may form a connection with a mating structure.

The connecting member 16 may comprise a planar or generally planar wall, which may be connected between the planar or generally planar surfaces 22, 28 of the ends 12, 14. The planar or generally planar wall may extend at an angle in relation to a plane defined between the planar or generally planar surfaces 22, 28 of the ends 12, 14, and provides a rigid or generally rigid connection therebetween. To provide further rigidity, the connecting member 16 may comprise ribs, which may extend in opposing directions in relation to the planar or generally planar wall of the connecting member 16. In the illustrated embodiment, the ribs are tapered away from the ends 12, 14 to provide ample clearance for the connection of the mating structure to the ends 12, 14.

It is contemplated that the extension arm 10 may be injection molded or cast, or formed in some other suitable fashion, using one or more production or fabrication techniques that are suitable for producing the same efficiently and at a relatively low cost.

The extension arm 10 maybe formed entirely or at least in part of a polymer, preferably, a thermoplastic elastomer, and is at least in part semi-rigid, that is, generally stiff and solid, but not inflexible, or rigid in some degree, or partly but not fully or entirely rigid, so as to maintain a shape.

The extension arm 10 or at least a portion thereof may be formed of vibration damping material, which may suitably dissipate energy from or dampen vibrational forces passing through the extension arm 10. It should be appreciated that any elastomer suitable to absorb energy or dampen vibrational forces from the vessel, slotted track or mounting arrangement to the accessory or accessory mount may be suitable for carrying out the invention. It should be appreciated that an elastomer having a durometer, for example, in a range of 60-100 Shore A or 0-60 Shore D, or other suitable range, may be suitably selected to dissipate energy or dampen vibrational forces. Other elastomers having other durometers, depending on the size and weight of the extension arm 10 and/or the accessory or accessory mount supported thereby, may be used to carry out the invention.

The instant invention need not rely on a hardness scale to define flexibility. And it should be appreciated that a thermoplastic can achieve the same or similar results, but with some limitations: a plastic has a deformation point where it bends and permanently deforms, no longer returning to its original shape. This point is much lower for a thermoplastic versus a thermoplastic elastomer. Additionally, the geometry of the thermoplastic is generally biased in the direction it wants to most easily flex without permanently deforming, whereas a thermoplastic elastomer can, within reason, flex without permanent deformation in all directions.

Figure 3:
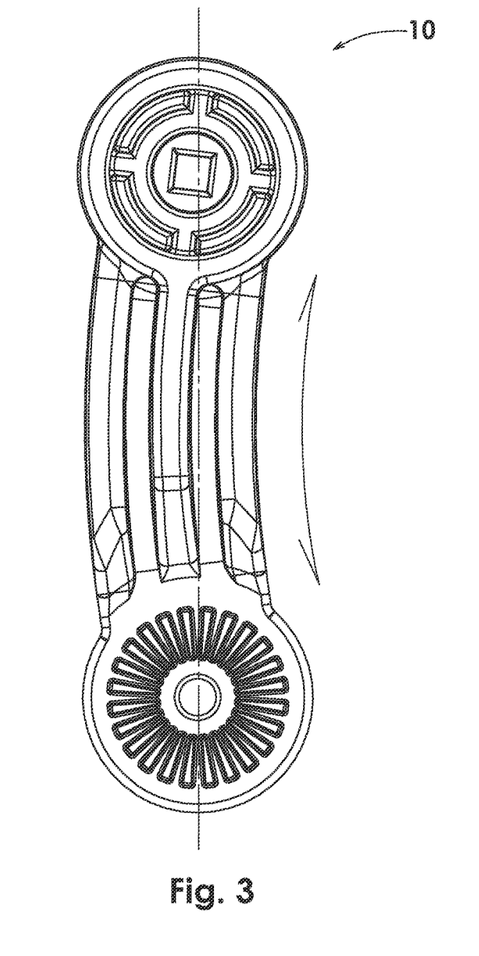
FIG. 3 is an elevational view of the extension arm shown in FIGS. 1 and 2 in a flexed condition (e.g., along a longitudinal axis).
Figure 4:
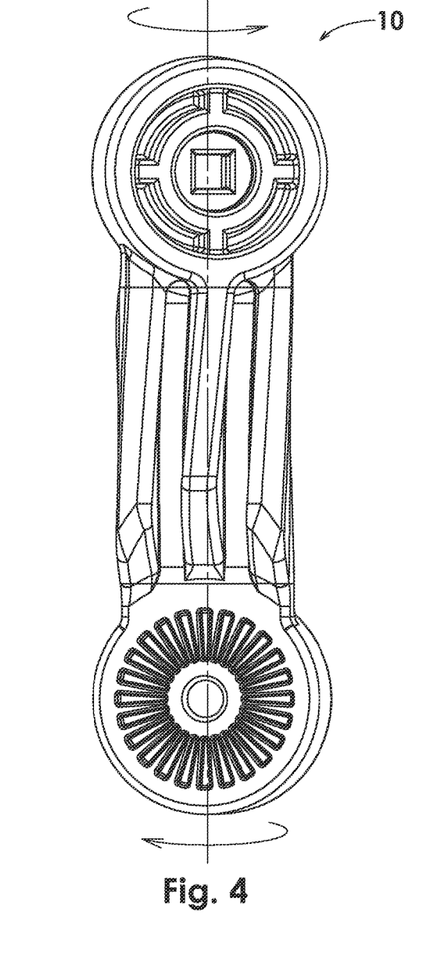
FIG. 4 is an elevational view of the extension arm shown in FIGS. 1 and 2 in a twisted condition (e.g., about the longitudinal axis).
Figure 5:
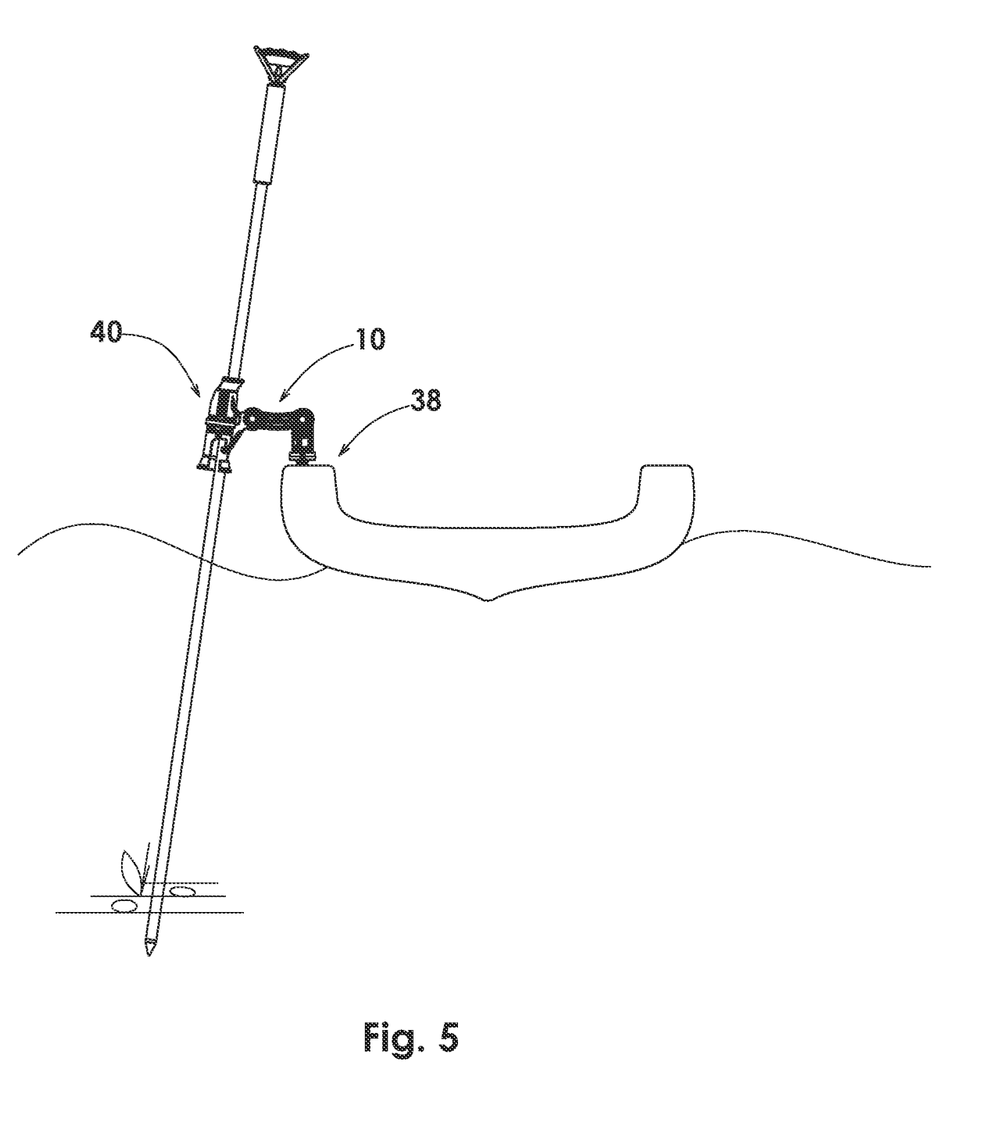
FIG. 5 is an environmental side elevational view of the extension arm shown in FIGS. 1 and 2, drawn to reduced scale, mounted to a marine vessel (e.g., a kayak), and supporting a mounting assembly for supporting an accessory (e.g., a stakeout or push pole), as diagrammatically represented.

As shown in FIG. 3, an exemplary extension arm 10 may be flexible so as to be capable of flexing or being in a flexed condition (e.g., along a longitudinal axis (along a lengthwise or long direction)), and as shown in FIG. 4, the extension arm 10 is capable of being twisted in a twisted condition (e.g., about the longitudinal axis). At the same time, the extension arm 10 is sufficiently rigid to hold accessories in relation to a mounting surface. For example, the extension arm 10 may be supported in relation to a mounting surface 38, such as the surface of a marine vessel (e.g., a kayak) at one end of the extension arm 10 while supporting an accessory 40, such as a rod or pole holder (e.g., for supporting a stakeout or push pole), at an opposing end of the extension arm 10, as shown in FIG. 5.

Now with reference to FIGS. 6-9, there is illustrated an extension arm comprised of a mating structure comprising an integral accessory mounting bracket 42 to which an accessory 44 may be removably attached. The accessory 44 shown is a roller grip arrangement. However, it should be appreciated that accessories of various sizes, shapes and uses, or brackets designed to clamp or support such accessories, could be used instead of or in addition to the accessory 44 shown. The illustrated accessory 44 shall not in any way be construed as a limitation as to the size, shape or type of accessory that could be attached to the accessory mounting bracket 42.

The extension arm 10' may be configured to be mounted in relation to a supporting environmental surface, which may be part of a vehicle, such as, for example, a marine vessel (e.g., a boat or kayak). The supporting environmental surface may alternately be part of a structure, such as, for example, a wall in a building or an armrest of a tree stand. It should be appreciated that the extension arm 10' may be supported in relation to an environmental surface without limitation to size, shape or configuration of possible supporting environmental surfaces or the method of attachment to such surfaces.

Figure 6:
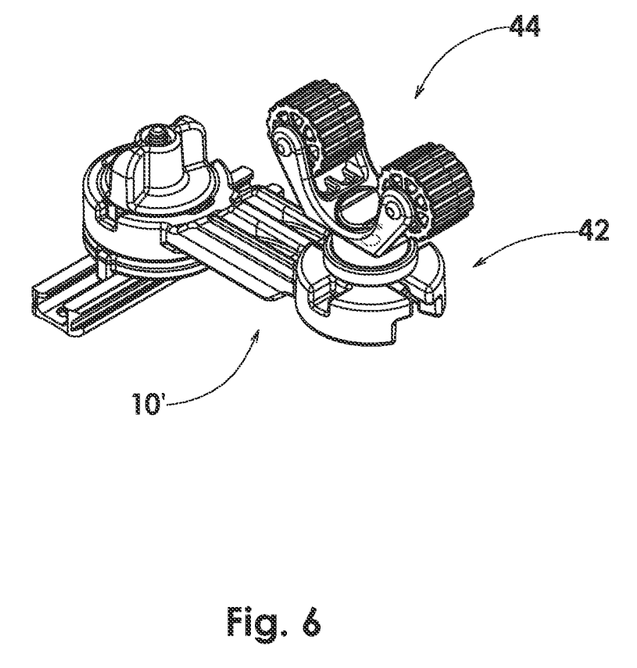
FIG. 6 is an environmental perspective view of an extension arm supported in relation to a slotted track and supporting an accessory mount assembly (e.g., for gripping a pole), wherein the extension arm has an integral accessory mounting bracket with a slot and discrete mounting features (e.g., discrete locking positions).
Figure 7:
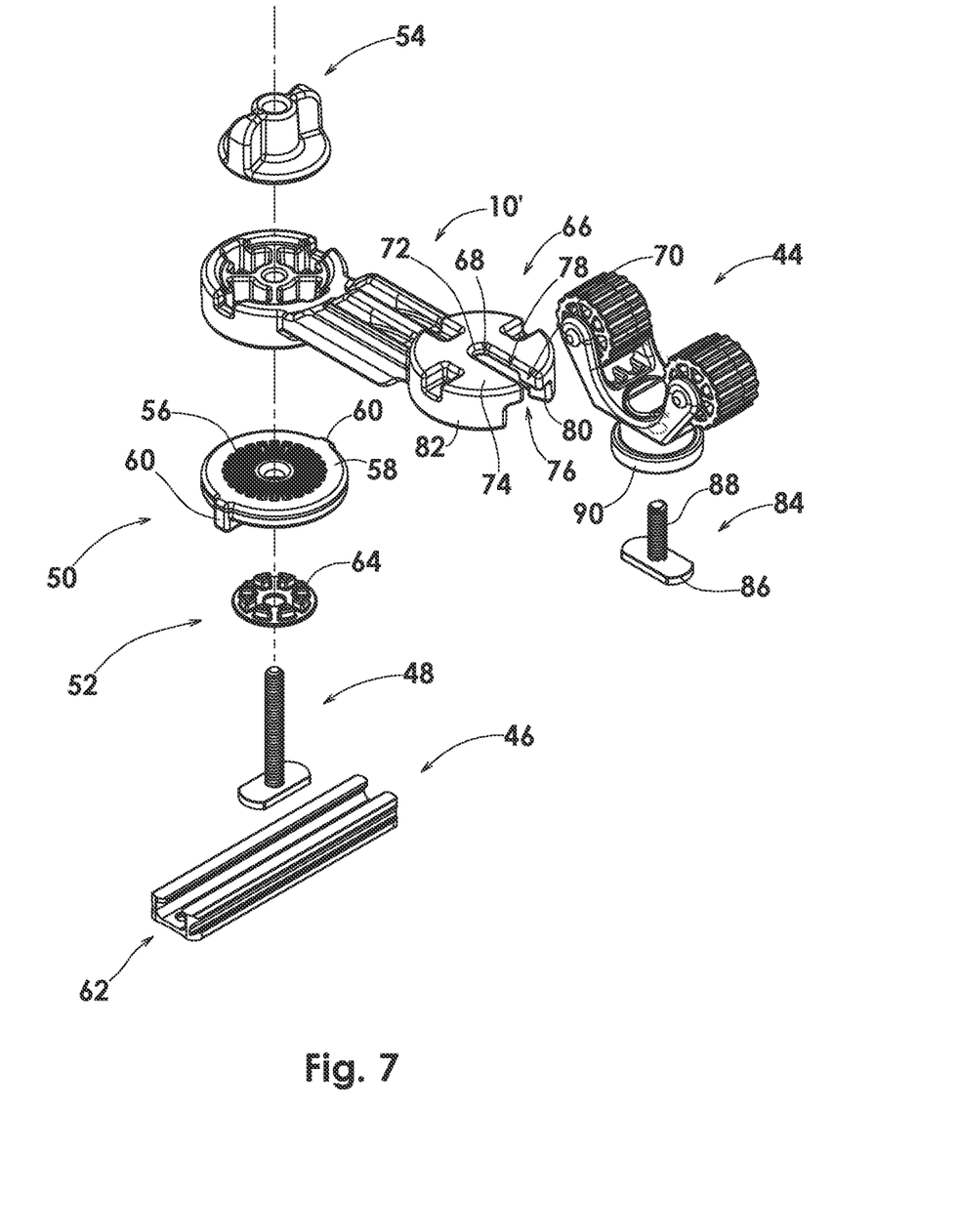
FIG. 7 is an exploded perspective view of an extension arm and environment shown in FIG. 6.

As shown in FIGS. 6 and 7, the extension arm 10' may be attached to a supporting environmental surface via a slotted track 46 using, for example, a tee-bolt 48, one or more washers 50, 52, and a wing nut 54. A first washer 50 may have a first surface, which may be comprised of a mating structure, which, for example, may comprise radially extending recesses or protrusions 56 supported in relation to a planar or generally planar surface 58. The recesses or protrusions 56 may be configured to engage protrusions or recesses of a mating structure supported in relation to an end of the extension arm 10', similar to the mating structures 18, 24 described above. An opposing side of the washer 50 may be comprised of an annular arrangement of pockets (not shown). Opposingly disposed interlocks 60 (e.g., radially extending teeth) may protrude from the opposing side of the washer 50 (e.g., protruding downward when viewing FIGS. 6 and 7). The interlocks 60 may be configured to engage a slot 62 in the slotted track 46 to resist angular movement of the washer 50, and thus the extension arm 10', in relation to the slotted track 46. A second washer 52 (e.g., a friction washer) may be formed of a rubber-like material, such as a synthetic elastomer (e.g., silicone), or rubber. The second washer 52 may inhibit or limit linear or sliding movement of the extension arm 10' along a track, when mounted in relation to a track, without discrete locking positions. The second washer 52 may further be comprised of an annular arrangement of protrusions 64, which are configured to mate with the pockets in the washer 50 to further resist angular movement of the washer 50. It shall be understood that alternate methods of attachment to the supporting environmental surface may be utilized without limiting the scope of this disclosure.

Figure 8:
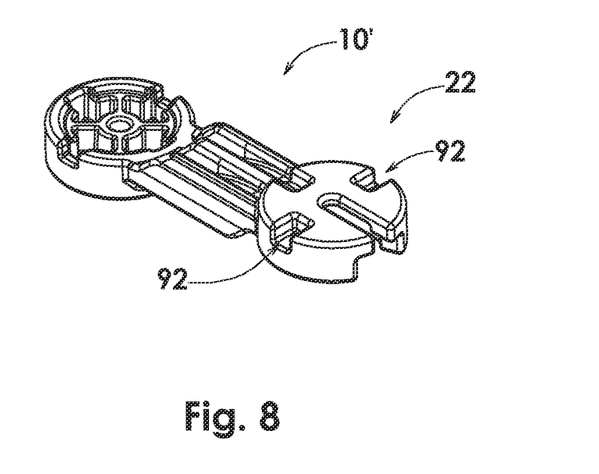
FIG. 8 is a perspective view of the extension arm shown in FIGS. 6 and 7.
Figure 9:
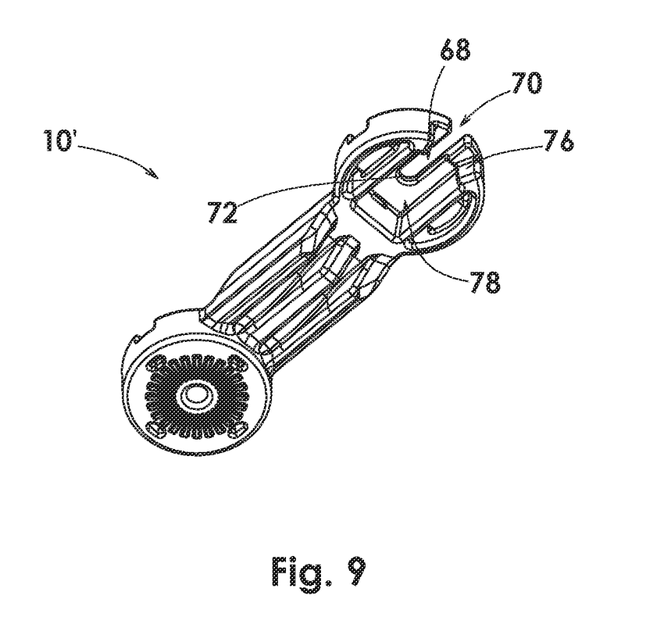
FIG. 9 is a perspective view of the extension arm shown in FIG. 8 as viewed from an opposing side.

Looking now at FIGS. 7, 8 and 9, the accessory mounting bracket 42 may comprise a base structure 66 and an open-ended slot 68, which may comprise a slot opening 70 on an end and a slot termination 72 on another end. The accessory mounting bracket 42 may further comprise an accessory mounting interface 74, a clearance channel 76 which may terminate at a retention pocket 78, a first lateral support pad 80, and a second lateral support pad 82. The retention pocket 78 may have a chamfer around the perimeter, at the interface between the clearance channel 76 and the retention pocket 78.

In FIG. 6, the accessory 44 is shown attached to the accessory mounting bracket 42. This may be accomplished by using a tee-bolt 84 comprising a head 86 and a threaded stud 88 threaded into the accessory 44. The tee-bolt 84 may be inserted into the open-ended slot 68 (as shown in FIG. 7), oriented so that the stud 88 passes through the open-ended slot 68 and into the threads in the accessory 44. The preferred method of this installation is to insert the stud 88 of the tee-bolt 84 into the slot opening 70 until the stud 88 makes contact with the slot termination 72. It should be appreciated that the clearance channel 76 is of sufficient depth to allow the head 86 of the tee-bolt 84 to pass between the supporting environmental surface and the accessory mounting bracket 42.

Once the accessory 44 is fully inserted into the slot 68, the accessory 44 may be lifted in a direction perpendicular to and away from the accessory mounting bracket 42 (in an upward direction when viewing FIGS. 6 and 7), causing the head 86 of the tee-bolt 84 to enter the retention pocket 78, which may be of sufficient width and length to accommodate the head 86 of the tee-bolt 84 closely so that the head 86 of the tee-bolt 84 is unable to turn a full rotation. It should be appreciated that the retention pocket 78 may serve as a mechanical restraint, restricting rotation of the head 86 of the tee-bolt 84.

The accessory 44 may have female threads (not shown), which are threaded onto the stud 88 of the tee-bolt 84. It should be appreciated that by rotating the accessory 44, the threads of the stud 88 may interact with the female threads, which may urge the accessory 44 toward or away from the head 86 of the tee-bolt 84, depending on the direction of rotation. When sufficiently rotated, the accessory 44 may be urged toward the head 86 of the tee-bolt 84 until amounting surface 90 of the accessory 44 makes contact with the accessory mounting interface 74 of the accessory mounting bracket 42 and the upper surface of the head 86 (shown in FIG. 7) makes contact with the inside of the retention pocket 78 (shown in FIG. 9). When the accessory 44 is turned farther, friction may increase between these surfaces, which may effectively lock the accessory 44 into position.

By rotating the accessory 44 in the opposite direction, the friction may be eliminated. However, because the distance between the inside of the retention pocket 78 and the accessory mounting interface 74 is substantially less than the distance between the clearance channel 76 and the accessory mounting interface 74, removal of the accessory 44 may not be achieved until the accessory 44 is continually rotated until the distance between the upper surface of the head 86 and the mounting surface 90 of the accessory 44 is greater than the distance between the clearance channel 76 and the accessory mounting interface 74. This additional rotation of the accessory 44, required for removal of the accessory 44 from the accessory mounting bracket 42, may provide significant security against accidental removal of the accessory 44 from the accessory mounting bracket 42 if the accessory 44 is inadvertently rotated in the direction that urges the tee-bolt 84 away from the accessory 44.

As mentioned above, the tee-bolt 84 may have a head 86 on one end and a threaded stud 88 on another end and may be attached to the accessory 44 by screwing the threaded stud 88 of the tee-bolt 84 into the accessory 44, leaving the head 86 of the tee-bolt 84 extended some distance from the accessory 44. Attachment of the accessory 44 may be achieved by inserting the head 86 of the tee-bolt 84 into the slot 68 and rotating the accessory 44. The interaction between the threads in the accessory 44 and the threaded stud 88 of the tee-bolt 84 may urge the head 86 of the tee-bolt 84 toward the accessory 44, thus causing the head 86 of the tee-bolt 84 to make contact with the underside of the retention pocket 78 and causing the accessory 44 to make contact with the accessory mounting interface 74 on the surface of the accessory mounting bracket 42 opposite the retention pocket 78. Further rotation of the accessory 44 may continually urge the head 86 of the tee-bolt 84 toward the accessory 44, creating pressure on these areas of contact, the resulting friction of which may be adequate to prevent rotation of the accessory 44, with reasonable force, in either the tightening or the loosening direction. For removal, the accessory 44 may be rotated in the opposite direction, which may force the head 86 of the tee-bolt 84 away from the accessory 44. Initially this may require relatively high force to overcome the friction of the tightened system, but as the accessory 44 is rotated the friction may dissipate, and ultimately the distance between the tee-bolt 84 and the accessory 44 may become great enough to remove the accessory 44 from the accessory mounting bracket 42.

It should be understood that, although a tee-bolt attachment method is depicted in these drawings, other methods of secure and removable attachment of the accessories to the accessory mounting bracket 42 may also be used. In an alternate configuration, a slot nut and stud configuration (not shown) may be used instead of a tee-bolt. In this configuration, the nut is not permanently attached to the stud as it is in the tee-bolt configuration, but instead has threads which interact with the stud, resulting in the same tightening effect that is achieved with the tee-bolt configuration.

In applications in which excessive rotational forces may be applied to the accessory 44, an external locking mechanism (not shown) may be used to prevent the accessory 44 from rotating in the loosening direction.

Another advantage of the accessory mounting bracket 42 is that the retention pocket 78 may captivate the head 86 of the tee-bolt 84 in a way that requires a significant gap between the head 86 of the tee-bolt 84 and the accessory 44 before the accessory 44 can be removed. In order to install the accessory 44 on the accessory mounting bracket 42, the head 86 of the tee-bolt 84 should be some distance from the accessory 44. That is, the gap between the head 86 of the tee-bolt 84 and the accessory 44 must be greater than the thickness of the entrance of the slotted region of the accessory mounting bracket 42. Because the retention pocket 78 is recessed some distance from the underside of the accessory mounting bracket 42, the thickness of the accessory mounting bracket 42 is less in that region than in the entrance of the slotted region. As a result, the tee-bolt 84 must be further tightened once the accessory 44 is fully inserted into the slot 68 in order to eliminate play between the tee-bolt 84, the accessory 44, and the accessory mounting bracket 42. Likewise, when the accessory 44 is loosened by rotating, it preferably cannot be removed from the accessory mounting bracket 42 until it is further rotated, enough to create a gap which is substantial enough to allow clearance from the thicker slotted region. In this way, the retention pocket 78 may function as a security feature because if the accessory 44 is accidentally loosened a small amount, the accessory 44 may not accidentally slip off the accessory mounting bracket 42.

Figure 10:
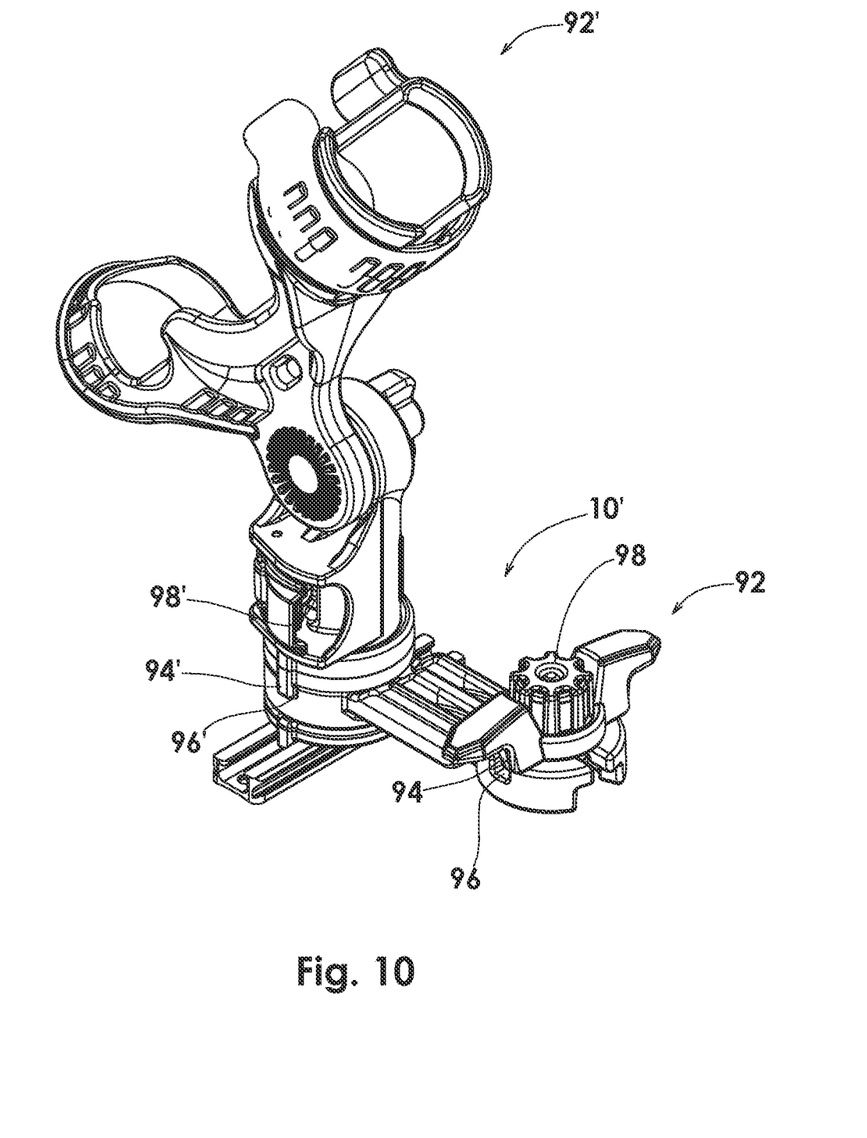
FIG. 10 is an environmental perspective view of an extension arm supported in relation to a slotted track and supporting an accessory (e.g., a rod holder) at one end in relation to the slotted track and another accessory (e.g., a cleat) at another end, spaced from the rod holder and the slotted track.

It should be appreciated that exemplary accessories 92, 92' for use with the extension arm 10' may be comprised of one or more physical interlocks 94, 94', such as keys, tabs, or nodules (similar to the interlocks 60 described above), which may cooperate with the slot 68 provided in the mounting bracket 42 (shown in FIG. 6), or alternatively, with one or more discrete physical mating interlocking features 96, 96' (e.g., pockets, recesses, or reliefs) provided, for example, along the sides of the extension arm 10', such as along the sides of the mounting bracket 42, such as along opposing sides of the slot 68 (shown in FIG. 7), as shown in FIG. 10. In such case, the accessory 92, 92' may be mounted to the mounting bracket 42 with a fastener, such a tee-bolt (like the tee-bolt 84 described above), that may pass through the accessory 92, 92' and threadably engage a knob, post or other suitable fastener 98, 98' like the wing nut 54 described above. Exemplary accessories are shown and described in U.S. Pat. No. 10,900,607, issued on Jan. 26, 2021, and U.S. Pat. No. 11,079,064, issued on Aug. 3, 2021, the disclosures of which are incorporated herein by reference in their entirety.

The interlocks 94, 94', upon tightening the fastener 98, 98' in relation to the tee-bolt, may mate with either the slot 68 or the interlocking features 96, 96' to resist or interfere with movement or translation of the accessory 92, 92' along the slot 68 or in relation to the mounting bracket 42.

It should be appreciated that cooperation of the interlocks 94, 94' with the interlocking features 96, 96' does not rely upon the relative tightness or force applied when tightening the fastener 98, 98' in relation to the tee-bolt. This cooperation also allows for easy attachment and removal of the accessory 92, 92' to and from the mounting bracket 42 at one or a plurality of discrete positions corresponding to the one or more discrete physical mating interlocking features 96, 96' along the mounting bracket 42. Alternatively, the accessory 92, 92' may be easily attached and removed to and from the mounting bracket 42 with the interlocks 94, 94' mating with the slot 68 anywhere along the slot 68 so that the position of the accessory 92, 92' is not restricted to the discrete positions of the interlocking features 96, 96' along the mounting bracket 42. One of the benefits of the invention is that it allows the accessory 92, 92' to be positively secured to the mounting bracket 42, with ease of use, particularly for those with arthritis or other issues with gripping and strength when trying to tighten or loosen the accessory 92, 92' securely.

It should be appreciated that when the accessory 92, 92' is tightened in relation to the mounting bracket 42 with the physical interlocks 94, 94' mating with the slot 68, the accessory is mounted parallel to or in a lengthwise direction of the mounting bracket 42. Alternatively, when the accessory 92, 92' is tightened in relation to the mounting bracket 42 with the interlocks 94, 94' mating with the one or more discrete physical mating interlocking features 96, 96' provided along the side of the mounting bracket 42, the accessory 92, 92' is mounted perpendicularly, crosswise or transversely to the lengthwise direction of the mounting bracket 42.

It should be understood that the interlocking features 96, 96', the slot 68, and the interlocks 94, 94' on the accessory 92, 92' may each have a width, which may be the same or approximately the same. In this way, the interlocks 94, 94' may mate with the slot 68 or the interlocking features 96, 96'.

The interlocks 94, 94' preferably extend downward from the accessory 92, 92' and in linear alignment with each other. The interlocking features 96, 96' along opposing sides of the mounting bracket 42 may be laterally spaced a distance and the interlocks 94, 94' extending from the accessory 92, 92' may be laterally spaced a distance approximately the same as the distance between the interlocking features 96, 96'. In this way, the accessory 92, 92' may be either positioned along the central axis of the mounting bracket 42 (i.e., lengthwise in relation to the extension arm 10') or perpendicularly, crosswise or transversely thereto.

The accessory 92, 92' may be attached to the mounting bracket 42 by inserting the tee-bolt 84 in a slot opening 70, and further until the threaded stud 88 of the tee-bolt 84 enters the slot 68 and a head 86 of the tee-bolt 84 enters the channel 76, below the slot 68. Rotation of the head 86 in the channel 76 is restricted by a containment ledge along the opposing sides of the channel 76. The head 86 is also prevented from escaping from the channel 76 by the containment ledge along the opposing sides of the channel 76. The accessory 92, 92' may be positioned along a central axis of the mounting bracket 42, with the channel 76 containing the tee-bolt 84 therein, but not preventing movement along the central axis (along a lengthwise direction in relation to the extension arm 10'), until fully attached to the mounting bracket 42.

It should be appreciated that by rotating the fastener 98, 98' the threads of the threaded stud 88 interact with a threaded through-hole of the fastener 98, 98', which may urge the accessory toward or away from the head 86 of the tee-bolt 84, depending on the direction of rotation. When appropriately rotated, the accessory 92, 92' is urged toward the head 86 of the tee-bolt 84 until the accessory 92, 92' contacts an upper surface of the mounting bracket 42 (or a friction washer, like the washer 52 described above) and the head 86 contacts the containment ledge along each side of the channel 76. When the accessory 92, 92' is turned farther, friction is increased between these areas of contact, which effectively attaches the accessory 92, 92' into position. By rotating the fastener 98, 98' in the opposite direction, the accessory 92, 92' may once again be positioned along the central axis (along a lengthwise direction in relation to the extension arm 10') or removed from the mounting bracket 42 through the slot opening 70 by sliding the tee-bolt 84 out of the slot opening 70 at the end of the mounting bracket 42.

It should be understood that the interlocks 94, 94' on the accessory 92, 92' may communicate with the slot 68 in one position, preventing the accessory 92, 92' from rotating with respect to the slot 68. The accessory 92, 92' may be tightened (via tightening of the fastener 98, 98') to apply frictional force between the underside of the accessory 92, 92' (or optionally, a friction washer) and the resistance to motion is a function of the compression provided by the accessory 92, 92' and the tee-bolt 48. However, if sufficient force is applied in the direction of the slot 68, the accessory 92, 92' may ultimately slide in the slot 68. However, if the accessory 92, 92' is rotated (e.g., 90°) with the interlocks 94, 94' on the accessory 92, 92' over the mating interlocking features 96, 96' and the accessory 92, 92' is tightened so that the interlocks 94, 94' on the accessory 92, 92' mate with the interlocking features 96, 96', the force required to move the accessory 92, 92' relative to the mounting bracket 42 would need to be sufficient to break either one or both of the parts (i.e., the accessory 92, 92' or the mounting bracket 42). This position does not rely on frictional engagement, which permits ease of attachment (i.e., over-tightening the accessory 92, 92' serves no purpose when the interlocks 94, 94' on the accessory 92, 92' mate with the interlocking features 96, 96'), and which permits removal of the accessory 92, 92' by loosening the accessory 92, 92' to increase the gap (i.e., loosening the accessory 92, 92' to allow the interlocks 94, 94' on the accessory 92, 92' to be moved out of their mating relationship with the interlocking features 96, 96').

It should be clearly understood that the mounting bracket 42 allows for positioning of the accessory 92, 92' in two positions. In a first position, along the central axis of the mounting bracket 42, the interlock 94, 94' on the accessory 92, 92' mates with the slot 68 and rotation of the accessory 92, 92' in relation to the slot 68 is prevented. In this position, tension on the accessory 92, 92' dictates the ease or difficulty to move the accessory 92, 92' along the mounting bracket 42. In a second position, perpendicular, crosswise or transverse to the central axis of the mounting bracket 42, the interlocks 94, 94' on the accessory 92, 92' mate with the interlocking features 96, 96' and rotation of the accessory 92, 92' in relation to the mounting bracket 42 is prevented. In this position, tension on the accessory 92, 92' does not dictate the ease or difficulty to move the accessory 92, 92' along the mounting bracket 42. Instead, movement or prevention thereof is dictated by the cooperation of the interlock 94, 94' on the accessory 92, 92' and the interlocking feature 96, 96'.

It should be appreciated that because the interlocks 94, 94' on the accessory 92, 92' have a width that is the same or approximately the same as the width of the slot 68, and the distance between the interlocking features 96, 96' is the same or approximately the same as the distance between the interlocks 94, 94' on the accessory 92, 92', and the interlocking features 96, 96' have a width that is the same or approximately the same as the width of the interlocks 94, 94' on the accessory 92, 92', positioning of the accessory 92, 92' is optimized.

It should further be appreciated that the invention may be carried out with one or more interlocks 94, 94' on the accessory 92, 92'. Additionally, although interlocking features 96, 96' are shown along each of the opposing sides of the mounting bracket 42, interlocking features 96, 96' may be provided along one or the other side, if only one interlocking feature 96, 96' is employed. Moreover, interlocking features 96, 96' may be provided along each of the opposing sides, and staggered in relation to the interlocking features 96, 96' provided along the opposing side of the mounting bracket 42, for more finite positioning of the accessory 92, 92'.

The spacing of the interlocking features 96, 96' and the interlocks 94, 94' on the accessory 92, 92' may be dictated by a combination of manufacturing tolerances and/or techniques (e.g., wall thicknesses and filling voids in molds with plastics versus milling or casting metal), material strength as it relates to the thickness of the area adjacent to the interlocking features 96, 96', the size of the mounting bracket 42, and aesthetics.

Ideally, there should be little, aside from friction and the angle of the threads, preventing the accessory 92, 92' from becoming loosened, as there is little to encourage the accessory 92, 92' from releasing from a tee-bolt 84. Absent any excessive vibration or a direct attempt to consciously loosen the accessory 92, 92', the accessory 92, 92' should remain affixed to the tee-bolt 84. The width of the interlocking features 96, 96' and the width of the slot 68 is preferably the same or approximately the same as (i.e., closely matched to) the width of the interlocks 94, 94' on the accessory 92, 92', to reduce the risk that the accessory 92, 92' will become loosened in relation to the mounting bracket 42.

It should be understood that the mounting bracket 42 may take on other configurations. For example, a mounting bracket could include interlocking features in the form of serrations, or a saw tooth configuration, which could cooperate with similar interlocks on an accessory. The interlocking features and interlocks on the accessory could be angled such that the accessory could be adjusted more easily to discrete locations by pushing the accessory along the axis of the mounting bracket, rather than lifting and sliding the accessory, when the tension of the tee-bolt 84 is sufficiently loosened to allow the accessory to disengage the interlocking features.

Although a tee-bolt attachment method is depicted in these drawings, other methods of securing and removing accessories in relation to the mounting bracket may also be used. For example, in an alternate configuration, a slot nut and stud configuration (not shown) may be used instead of a tee-bolt. In this configuration, the slot nut may be inserted into the slot 68 instead of the head of a tee-bolt. The slot nut would not necessarily be permanently attached to the stud as it is in the tee-bolt configuration, but instead would have female threads that interact with a stud, resulting in a tightening effect that is similar to that of the tee-bolt configuration.

Because the invention allows the attachment of an accessory, at a discrete point or series of discrete points along a mounting bracket, sliding the accessory along the mounting bracket may be an undesirable consequence of loading the accessory generally along the direction of the slot. A rubber friction washer (similar to the washer 52 described above) can be used to increase static friction to minimize sliding between surfaces but can be overcome with enough force. Additionally, various users may have various grip strength to tighten or loosen the compression of the friction, making secure attachment or the ability to remove the attached accessory uncertain. Additionally, rotation of the accessory can result in rotation of the fastener 98, 98' used to secure the accessory 92, 92', resulting in the accessory 92, 92' (thought to be secured) becoming loose when the accessory 92, 92' rotates relative to a mounting bracket 42 and/or tee-bolt.

The addition of the interlocking features 96, 96' along the outside of the slot 68 (on one or both sides of the mounting bracket 42), in communication with the interlocks 94, 94' on the accessory 92, 92', could prevent translation of the accessory 92, 92' along the slot 68, even if static friction forces are exceeded. Simply rotating the fastener 98, 98' to a point where the interlocks 94, 94' on the accessory 92, 92' are communicating with the interlocking features 96, 96' prevents rotation of the accessory 92, 92' and translation of the accessory 92, 92' along the mounting bracket 42.

Although the interlocking features 96, 96' may be oriented along opposing sides of the slot 68, arranged in a lengthwise direction of the extension arm 10', it is conceivable that the interlocking features 96, 96' may be oriented in some other suitable manner. Moreover, it is conceivable that the interlocking features 96, 96' could be recesses or detents, as shown, or raised bosses (not shown). In either event, the accessory 92, 92' may be attached and/or tightened to the mounting bracket 42 by positioning the interlocks 94, 94' on the accessory 92, 92' in relation to the slot 68 or the interlocking features 96, 96'. That is to say, the accessory 92, 92' may be attached to the mounting bracket 42 in a lengthwise direction so that the interlocks 94, 94' on the accessory 92, 92' engage the slot 68. Alternatively, the accessory 92, 92' may be attached generally perpendicularly, crosswise or transversely in relation to the mounting bracket 42 with the interlocks 94, 94' on the accessory 92, 92' engaging the interlocking features 96, 96'. When the accessory 92, 92' is tightened to the mounting bracket 42, with the interlocks 94, 94' on the accessory 92, 92' engaging the interlocking features 96, 96', the accessory 92, 92' is attached in place with respect to both rotation and travel in any direction. This is a significant improvement over conventional attachment devices, which can fail once static friction forces are exceeded. Friction forces are a function of the materials being clamped together, and the force with which they are attached. With the interlocks 94, 94' on the accessory 92, 92' engaging the interlocking features 96, 96', the resistance to movement is independent of frictional forces.

It should be appreciated that the discrete interlocking features 96, 96' are preferably located generally perpendicularly, crosswise or transversely in relation to a longitudinal direction of the mounting bracket 42, although the angle of interlocking features 96, 96' may be at any angle other than in line with the slot 68.

It should also be appreciated that the interlocks 94, 94' on the accessory 92, 92' may cooperate with the slot 68 in the mounting bracket 42, regardless of the presence of the interlocking features 96, 96' on the mounting bracket 42 perpendicularly, crosswise or transversely in relation to the slot 68. However, the interlocking features 96, 96' on the mounting bracket 42 mating with the interlocks 94, 94' on the accessory 92, 92' physically prevent the accessory 92, 92' from moving with relation to the slot 68 when the accessory 92, 92' is sufficiently tightened, due to physical interference rather than simple friction. Minimal grip strength and minimal torque may be applied to the accessory 92, 92' to lock the accessory 92, 92' in place in relation to the mounting bracket 42. This reduces the risk of over stressing the accessory 92, 92' or components thereof, which results in accessories and related devices (e.g., cameras, cup holders, fishing rods, etc.) becoming broken.

It should be understood that the slot 68 in the mounting bracket 42 may be sufficiently short or shallow to accept a tee-bolt 84 but not interlocks 94, 94' of an accessory 92, 92'. However, when the accessory 92, 92' is rotated (e.g., 90 degrees), the interlocks 94, 94' on the accessory 92, 92' may engage corresponding interlocking features 96, 96' along opposing sides of the slot 68. A mounting bracket 42 of this nature may be useful to minimize the overall footprint thereof. Clearly, the slot 68 and interlocking features 96, 96' may be supported in relation to any suitable environment and the single slot entry point (e.g., a slot opening 70) for a tee-bolt 84 may be provided to minimize the footprint of the mounting bracket 42. Moreover, the slot 68 is not required to communicate with one or both of the interlocks 94, 94' of the accessory 92, 92'. Clearly, the accessory 92, 92' could have one interlock 94, 94' extending from one end thereof.

It should be appreciated that the extension arm 10' may be formed of any suitable material, including, for example, metal, plastic, or other suitable material. Various components thereof may be of solid construction or hollow, or a combination thereof. The same may be cast, cut, molded, extruded, or formed in some other suitable manner.

It should be appreciated that the extension arm 10' maybe formed entirely or at least in part of a polymer, preferably, a thermoplastic elastomer, and is at least in part semi-rigid, that is, generally stiff and solid, but not inflexible, or rigid in some degree, or partly but not fully or entirely rigid, so as to maintain a shape, like the extension arm 10 described above.

The extension arm 10' or at least a portion thereof may be formed of vibration damping material, which may suitably dissipate energy from or dampen vibrational forces passing through the extension arm 10'. It should be appreciated that any elastomer suitable to absorb energy or dampen vibrational forces from the vessel, slotted track or mounting arrangement to the accessory or accessory mount may be suitable for carrying out the invention. It should be appreciated that an elastomer having a durometer, for example, in a range of 60-100 Shore A or 0-60 Shore D, or other suitable range, may be suitably selected to dissipate energy or dampen vibrational forces. Other elastomers having other durometers, depending on the size and weight of the extension arm 10' and/or the accessory or accessory mount supported thereby, may be used to carry out the invention.

The invention need not rely on a hardness scale to define flexibility. And it should be appreciated that a thermoplastic can achieve the same or similar results, but with some limitations: a plastic has a deformation point where it bends and permanently deforms, no longer returning to its original shape. This point is much lower for a thermoplastic versus a thermoplastic elastomer. Additionally, the geometry of the thermoplastic is generally biased in the direction it wants to most easily flex without permanently deforming, whereas a thermoplastic elastomer can, within reason, flex without permanent deformation in all directions.

The extension arm 10' may be flexible so as to be capable of flexing or being in a flexed condition (e.g., along a longitudinal axis (along a longitudinal or lengthwise direction)), like the extension arm 10 shown in FIG. 3, and the extension arm 10' is capable of being twisted in a twisted condition (e.g., about the longitudinal axis), like the extension arm 10 shown in FIG. 4. At the same time, the extension arm 10' is sufficiently rigid to hold accessories in relation to a mounting surface.

It should be understood that the accessories shown are merely shown for exemplary purposes. A vast number of accessory devices (e.g., camera mounts, fish finders, rod holders, cup holders, posts or oar holders, etc.) can be used with the extension arms 10, 10' described herein.

It should also be understood that the extension arms 10, 10' can be positioned radially with the mounting structure parallel to the face of the supporting surface, or perpendicular to the face of the supporting surface. Both ends of the extension arms 10, 10' can have accessories attached thereto, as will be apparent from the description below. In the case of the end closest to the supporting surface (e.g., when mounted to a slotted track using a tee-bolt), a knob may be replaced by an accessory having a threaded portion so that the accessory may act as a knob used to affix the extension arm 10, 10' to the supporting surface, for example, when using a tee-bolt. This effectively may provide an offset secondary mounting position, creating an additional mounting location for a second accessory than the track may otherwise provide. This additional mounting location may be positioned radially at discrete angular positions around the track mounting point.

The features of the extension arm 10' includes geometry that mates with accessories to prevent rotation in a traditional track application, also preventing unwanted rotation of an accessory when mounted to the extension arm 10'.

It should be appreciated that the slot 68 at the end of the extension arm 10' is provided at the center of the mounting surface (i.e., mounting bracket 42), allowing for a tee-bolt to be installed in an accessory and simply loosened to be removed from or added to the extension arm 10'. Without this slot 68, the tee-bolt must be removed and passed through a hole in the extension arm 10' to install an accessory on the extension arm 10'. When in situations where one-handed attachment is advantageous, the slot 68 is a novel solution to prevent the loss of hardware or the need to use two hands to attach an accessory.

The underside of the slotted end has geometry (e.g., a retention pocket 78) to limit the rotation of the head of a tee-bolt, allowing an accessory to be tightened onto the tee-bolt and secured to the extension arm.

It should be appreciated that a portion of the extension arms described herein, such as the connecting member, may be formed of a vibration damping material, so as to isolate the ends and/or dampen vibration between the ends of the extension arm, while permitting the extension arm to flex or twist. Alternatively, one or both ends may be formed of a vibration damping material so as to isolate the accessory from the vessel, slotted track or mounting arrangement, in which case, the vibration damping material may also function to enhance frictional engagement between the ends and the mating structures. Of course, the extension arms may be formed or substantially formed wholly or entirely by a vibration damping material.

Alternatively, the extension arms may have a form that is generally rigid (e.g., a rigid internal structure), and may comprise an outer structure formed of a vibration damping material, which may be suitably configured to isolate the ends and/or dampen vibration between the ends, and thus, between the vessel, slotted track or mounting arrangement at one end of the extension arm and the accessory or accessory mount at the other end of the extension arm.

It should be noted that the extension arm 10' accommodates the attachment of an accessory 92, 92' at each end thereof, including the end to which the extension arm 10' is mounted in relation to the supporting surface. That is to say, as shown in FIG. 10, the end of the extension arm 10', which is mounted in relation to the supporting surface (e.g., via a slotted track) may also have an accessory 92, 92' mounted thereto, giving an additional mounting point in relation to the extension arm 10'. For example, an accessory, such as a cup holder or rod holder, can be mounted to the end of the extension arm 10' which is mounted in relation to the supporting surface (e.g., via a slotted track) and another accessory, such as a cleat, camera mount, pole mount or support, can be mounted to the opposite end. This provides multiple points for mounting accessories, while occupying a single mounting point in relation to the support surface (e.g., or slotted track). This provides much greater versatility of use.

It should be understood that, for the scope of this entire disclosure, orientation terms, such as "upper" and "lower or lop" and "bottom" or "left" and "right", refer to their subject matter as semantic conveniences only and not as a necessary condition of the extension arm 10, 10', as the extension arm 10, 10' may obviously be utilized in any desired position or orientation.

While the invention and components parts thereof may have been described herein in terms of certain components being referred to in either the singular or the plural, other arrangements are possible. For example, it is to be understood that due to the conceptual description presented herein, components presented in the singular may be provided in the plural, and vice versa.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

PARTS LIST 10 extension arm
10' extension arm
12 first end
14 second end
16 connecting member
18 first mating structure (on first end)
20 radially extending recesses
22 planar or generally planar surface
24 first mating structure (on second end)
26 radially extending protrusions
28 planar or generally planar surface
30 counterbore
32 counterbore
34 holes or passages
36 holes or passages
38 surface
40 accessory
42 mounting bracket
44 accessory
46 slotted track
48 tee-bolt
50 washers (keyed)
52 washers (rubber)
54 wing nut
56 radially extending recesses or protrusions
58 planar surface
60 opposingly disposed, radially extending teeth
62 slot (in the track)
64 annular arrangement of protrusions
66 base structure
68 open-ended slot
70 slot opening
72 slot termination
74 accessory mounting interface
76 clearance channel
78 retention pocket
80 first lateral support pad
82 second lateral support pad
84 tee-bolt
86 head
88 stud
90 mounting surface (of the accessory)
92 accessory
92' accessory
94 interlock
94' interlock
96 interlocking features
96' interlocking features
98 fastener
98' fastener

What is claimed is:

1. An extension arm for mounting an accessory to a support surface, the extension arm comprising:
    a first end comprised of a mating structure configured to be matingly engageable with a mating structure of the support surface for connecting the first end to the support surface,
    a second end comprised of a mating structure configured to be matingly engageable with a mating structure of the accessory for connecting the second end to the accessory, and
    a connecting member between the first end and the second end for connecting the first end in relation to the second end in spaced relation to one another,
    wherein the second end mating structure is in the form of an integral accessory mounting bracket to which the accessory may be removably connected, the accessory mounting bracket comprising:
        a base structure comprising:
        an accessory mounting interface atop the base structure,
        a clearance channel beneath the base structure, the clearance channel terminating at a retention pocket,
        an open-ended slot defined by the base structure and extending between the accessory mounting interface and the clearance channel, the open-ended slot for receiving a fastener for mounting the accessory to the base structure.

2. The extension arm of claim 1, wherein the retention pocket has a chamfer that exists around a perimeter thereof, at an interface between the clearance channel and the retention pocket.

3. The extension arm of claim 1, wherein the open-ended slot is configured to receive the fastener in a form of a tee-bolt comprising a head and a threaded stud, the tee-bolt being insertable into the open-ended slot, oriented so that the stud passes through the open-ended slot and into threads in the accessory.

4. The extension arm of claim 3, wherein the open-ended slot comprises a slot opening at one end for insertion of the tee-bolt into the open-ended slot and a slot termination on another end for contact with the threaded stud for limiting travel of the threaded stud in the open-ended slot.

5. The extension arm of claim 3, wherein the clearance channel is of sufficient depth to allow the head of the tee-bolt to pass therein.

6. The extension arm of claim 3, wherein the retention pocket is configured to receive the head of the tee-bolt and is of sufficient width and length to accommodate the head of the tee-bolt closely so that the head of the tee-bolt is unable to turn a full rotation to serve as a mechanical restraint, restricting rotation of the head of the tee-bolt.

7. The extension arm of claim 3, wherein when sufficiently rotated, the accessory may be urged toward the head of the tee-bolt until the accessory makes contact with the accessory mounting interface of the accessory mounting bracket and an upper surface of the head of the tee-bolt makes contact with an inside of the retention pocket to hold the accessory in position.

8. The extension arm of claim 7, wherein a distance between the inside of the retention pocket and the accessory mounting interface is substantially less than a distance between the clearance channel and the accessory mounting interface so that removal of the accessory may not be achieved until the accessory is continually rotated until the distance between the upper surface of the head and the accessory is greater than the distance between the clearance channel and the accessory mounting interface.

9. The extension arm of claim 3, wherein the retention pocket is configured to capture the head of the tee-bolt in a way that requires a significant gap between the head of the tee-bolt and the accessory before the accessory can be removed from the accessory mounting bracket.

10. The extension arm of claim 1, further comprising one or more discrete physical mating interlocking features provided along the sides of the mounting bracket, along opposing sides of the slot, that are configured to cooperate with one or more physical interlocks of the accessory to resist or interfere with movement or translation of the accessory along the slot or in relation to the mounting bracket.

11. The extension arm of claim 10, wherein the one or more discrete physical mating interlocking features are in the form of pockets, recesses, or reliefs that cooperate with physical interlocks of the accessory, which are in the form of keys, tabs, or nodules.

12. The extension arm of claim 10, wherein the one or more discrete physical mating interlocking features are configured for easy attachment and removal of the accessory to and from the mounting bracket at one or more discrete positions corresponding to the one or more discrete physical mating interlocking features along the mounting bracket.

13. The extension arm of claim 10, wherein the slot is configured so that the accessory is alternatively attachable and removable to and from the mounting bracket with the interlocks of the accessory mating with the slot anywhere along the slot so that the position of the accessory is not restricted to the discrete positions of the interlocking features along the mounting bracket.

14. The extension arm of claim 10, wherein the interlocking features and the slot have a width that is equal to or approximately equal to a width of the interlocks of the accessory.

15. The extension arm of claim 10, wherein the interlocking features along opposing sides of the mounting bracket are laterally spaced.

16. The extension arm of claim 1, wherein the mounting bracket is configured so that the accessory is mountable in finite positions in a lengthwise direction in relation to the slot or alternatively, perpendicular or transversely to the lengthwise direction of the mounting bracket at one or more discrete positions.

17. The extension arm of claim 1, wherein the mounting bracket is configured for positioning the accessory in two positions, a first position along the slot of the mounting bracket, and a second position, perpendicular or transverse to the slot of the mounting bracket.

18. The extension arm of claim 1, wherein the mounting bracket comprises an interlocking feature along one of opposing sides of the mounting bracket for cooperation with the accessory to hold the accessory in a discrete position in relation to the mounting bracket.

19. The extension arm of claim 1, wherein the mounting bracket comprises one or more interlocking features along opposing sides of the mounting bracket, interlocking features being provided along each of the opposing sides, and staggered so as not to be laterally aligned with the interlocking features provided along the opposing sides of the mounting bracket.

20. The extension arm of claim 1, formed entirely or at least in part of a polymer that is generally stiff and solid, but not inflexible.

21. The extension arm of claim 1, comprising at least a portion thereof formed of vibration damping material, which is suitable to dissipate energy from or dampen vibrational forces passing therethrough.

22. The extension arm of claim 1, comprising at least a portion thereof that is flexible along a longitudinal axis of the extension arm to a flexed condition and twistable about the longitudinal axis to a twisted condition, while at the same time, the extension arm is sufficiently rigid to hold accessories in relation to the support surface.

* * * * *